(12) United States Patent  
Adams et al.

(10) Patent No.: US 9,001,213 B2  
(45) Date of Patent: Apr. 7, 2015

(54) MONITORING VIDEO WAVEFORMS

(71) Applicant: Phabrix Limited, Thatcham (GB)

(72) Inventors: Phillip Adams, Newbury (GB); Barry Donald Ruberry Miles, Newbury (GB)

(73) Assignee: Phabrix Limited, Thatcham, Berkshire (GB)

( * ) Notice: Subject to any disclaimer, the term of this patent is extended or adjusted under 35 U.S.C. 154(b) by 0 days.

(21) Appl. No.: 14/186,279

(22) Filed: Feb. 21, 2014

(65) Prior Publication Data

US 2014/0240517 A1  Aug. 28, 2014

(30) Foreign Application Priority Data

Feb. 22, 2013 (GB) .................................. 1303133.1

(51) Int. Cl.
*H04N 17/00* (2006.01)
*H04N 17/02* (2006.01)
*G09G 5/22* (2006.01)
*G06T 11/20* (2006.01)
*G06K 9/54* (2006.01)

(52) U.S. Cl.
CPC .................................. *H04N 17/004* (2013.01)

(58) Field of Classification Search
None
See application file for complete search history.

(56) References Cited

U.S. PATENT DOCUMENTS

| 4,364,080 | A | * | 12/1982 | Vidovic | 348/185 |
| 4,703,514 | A | * | 10/1987 | van der Wal | 382/302 |
| 5,530,454 | A | * | 6/1996 | Etheridge et al. | 345/440.1 |
| 6,278,435 | B1 | * | 8/2001 | Etheridge et al. | 345/440.1 |
| 6,333,732 | B1 | * | 12/2001 | Gerlach et al. | 345/440.1 |
| 2003/0231187 | A1 | | 12/2003 | Dobyns | |
| 2008/0012861 | A1 | * | 1/2008 | Dobyns et al. | 345/443 |

FOREIGN PATENT DOCUMENTS

| EP | 0677746 A2 | 10/1995 |
| EP | 0962779 A2 | 12/1999 |

* cited by examiner

*Primary Examiner* — Jefferey Harold
*Assistant Examiner* — Sean Haiem
(74) *Attorney, Agent, or Firm* — James Creighton Wray

(57) ABSTRACT

A video signal waveform monitor is shown, which receives an input video signal composed of video lines. A video signal digitizer samples the input video signal at video sample points to generate a sequence of video pixel data, which is written into an acquisition framestore is organized into a video pixel array so as to represent a raster of the input video signal. A level analyzer reads the video pixel data row-by-row from segments of the video pixel array and increments video level data at addresses in cache memory in response to the serially-read video pixel data. This generates a sequence of video level data, which is written into an output framestore and which represents the level of the waveform of the input video signal. The segments of the video pixel array comprise at least one and less than all of the columns in the video pixel array.

16 Claims, 8 Drawing Sheets

VIDEO PIXEL ARRAY WRITE PATTERN

VIDEO PIXEL ARRAY READ PATTERN

VIDEO PIXEL ARRAY WRITE PATTERN

VIDEO PIXEL ARRAY READ PATTERN

MONITORING VIDEO WAVEFORMS

CROSS REFERENCE TO RELATED APPLICATIONS

This application claims priority from United Kingdom patent application number 13 03 133.1 filed Feb. 22, 2013, the whole contents of which are incorporated herein by reference in their entirety.

BACKGROUND OF THE INVENTION

1. Field of the Invention

This invention concerns the generation and monitoring of video signal waveforms, such as those produced by camera apparatus in a broadcast environment, for example.

2. Description of the Related Art

Waveform monitors have been employed in television production environments for some time, so as to allow monitoring of the level of video signals with respect to time. Typically, waveform monitors are used by engineers to assist in calibration of video cameras, so as to match exposure, white balance and contrast etc. They may also be used in the installation and diagnostics of equipment in a broadcast environment, such as a television studio.

Analog waveform monitors are similar in construction to oscilloscopes, in that an electron beam in a cathode ray tube-type display is swept across the display, the display having phosphors deposited thereon. The magnitude of an input video signal from a device under test controls the vertical position of the electron beam during its sweep, with horizontal and vertical synchronization pulses controlling the electron beam's horizontal position. This allows the level of the video signal to be monitored. As will be appreciated by those skilled in the art, the phosphors glow at a degree determined by the instances of the electron beam exciting the phosphors at a particular position on screen, up to the point at which the phosphors saturate. Thus, repetitive signals appear brighter due to repeated illumination of phosphor by the electron beam. Additionally, the phosphorescence of the display exhibits persistence, which is to say there is a non-instantaneous decay to the brightness of the phosphor following illumination by the electron beam, thereby providing an opportunity to compare new data with old. This is particularly useful as it makes identifying an intermittent, anomalous signal component in an otherwise repetitive signal possible for an engineer.

More recently, digital waveform monitors have begun to be more commonly used, as they allow the inclusion of more features and capabilities, such as vectorscope display, eye pattern, jitter display and the like. Digitization of the input video signal is performed, followed by a degree of digital signal processing, possibly using field-programmable gate arrays. Such waveform monitors tend to use displays segmented into pixels, with a rasterizer being present to convert a video signal such that it is suitable for display. Given the fact that it is desirable to package digital waveform monitors into smaller formats, displays tend to be based on flat-panel technologies such as liquid crystal displays. Such display types do not exhibit the persistence of the phosphor coating used in cathode ray tube-type displays.

Thus, whilst there is increased sophistication in terms of the signal processing features available in modern digital devices over their analog predecessors, there are still some familiar characteristics of analog waveform monitors that it is desirable to emulate, such as the aforementioned phosphor persistence. Further, manufacturers are no less concerned with reducing power consumption, instrument complexity and component costs despite the move to a digital processing environment, therefore necessitating innovative approaches to providing the degree of processing required despite limited hardware capability.

BRIEF SUMMARY OF THE INVENTION

According to an aspect of the present invention, there is provided video signal waveform monitoring apparatus for receiving an input video signal composed of video lines, and whose level is to be monitored, the apparatus comprising: a video signal digitizer configured to sample the input video signal at video sample points, thereby generating a sequence of video pixel data; an acquisition framestore organized into a video pixel array having rows corresponding to video lines and columns corresponding to video sample points, into which the sequence of video pixel data is written so as to represent a raster of the input video signal; a level analyzer configured to serially read video pixel data row-by-row from segments of the video pixel array, and configured to increment video level data at addresses in cache memory in response to the serially-read video pixel data, from which a sequence of video level data is generated; and an output framestore organized into a display pixel array, into which the sequence of video level data is written, and which when read for display represents the level of the waveform of the input video signal; wherein the segments of the video pixel array comprise at least one and less than all of the columns in the video pixel array.

According to another aspect of the present invention, there is provided a method comprising generating a waveform from an input video signal, the input video signal being composed of video lines and whose level is to be monitored, the method including step of: digitizing the input video signal at video sampling points, thereby generating a sequence of video pixel data; writing the sequence of video pixel data into a video pixel array having rows corresponding to video lines and columns corresponding to video sample points, so as to represent a raster of the input video signal; serially reading video pixel data row-by-row from segments of the video pixel array; incrementing video level data at addresses in a cache, wherein the addresses are selected in response to the serially-read video pixel data, thereby generating a sequence of video level data; and writing the sequence of video level data to a display pixel array, which when read represents the level of the waveform of the input video signal; wherein the segments of the video pixel array comprise at least one and less than all of the columns in the video pixel array.

According to a further aspect of the present invention, there is provided a non-transitory computer readable medium having computer executable instructions encoded thereon, which, when executed by a computer, cause the computer to generate a waveform from an input video signal, the input video signal being composed of video lines and whose level is to be monitored, by carrying out steps of: digitizing the input video signal at video sampling points, thereby generating a sequence of video pixel data; writing the sequence of video pixel data into a video pixel array having rows corresponding to video lines and columns corresponding to video sample points, so as to represent a raster of the input video signal; serially reading video pixel data row-by-row from segments of the video pixel array; incrementing video level data at addresses in a cache, wherein the addresses are selected in response to the serially-read video pixel data, thereby generating a sequence of video level data; and writing the sequence of video level data to a display pixel array, which when read represents the level of the waveform of the input video signal; wherein the segments of the video pixel array comprise at least one and less than all of the columns in the video pixel array.

DETAILED DESCRIPTION OF EXAMPLE EMBODIMENTS

FIG. 1

Figure 1:
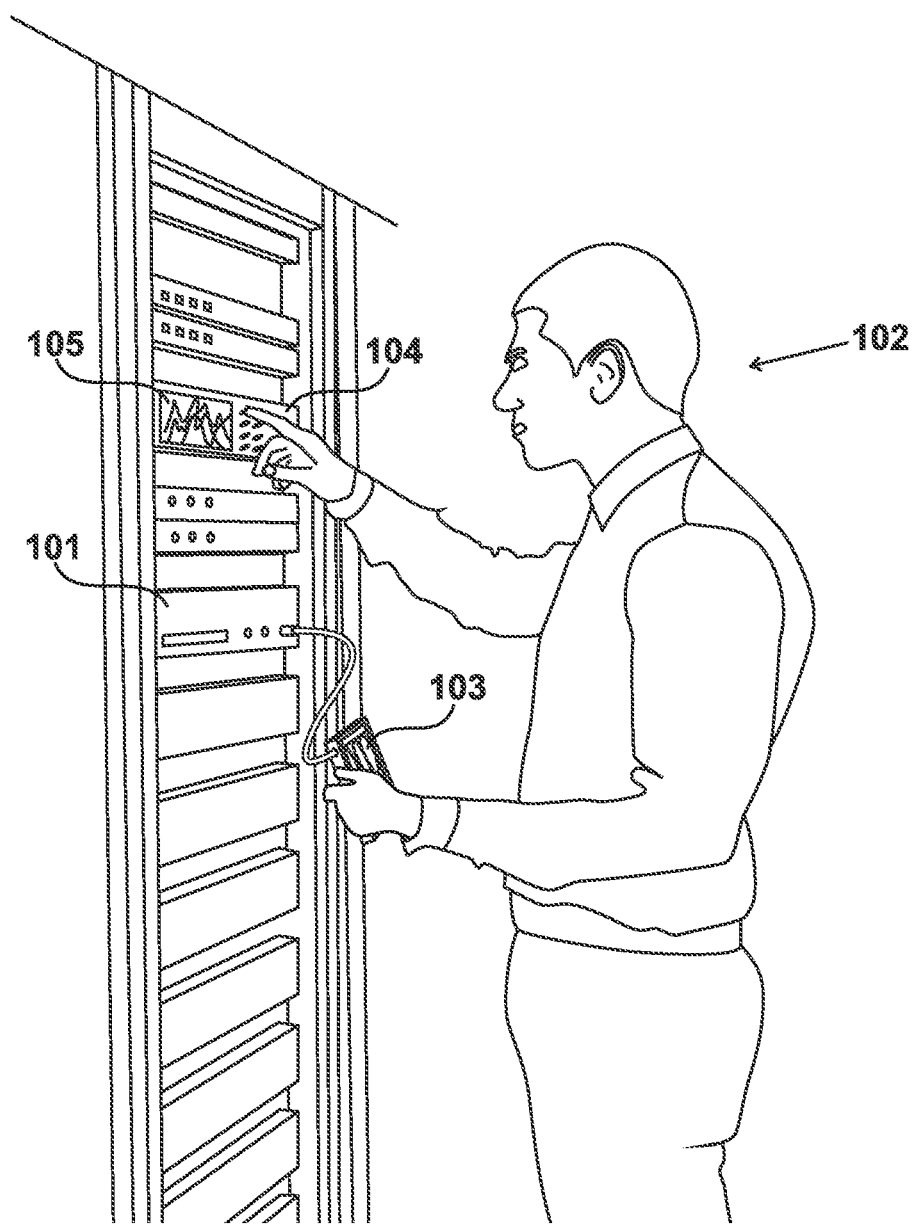
FIG. 1 shows an environment for evaluating the operation of a device under test.

An environment for evaluating the operation of a device under test is illustrated in FIG. 1. In this example, a device under test 101 is rack mounted and is configured to generate a serial digital video signal for high definition displays, possibly being transmitted at a data rate of 2.970 gigabits per second (3G-SDI, standardized in SMPTE 424M).

As illustrated in the Figure, an engineer 102 is supplying device under test 101 with a test signal from a hand-held test signal generator 103, such as those available from the present applicant.

Some aspects of the evaluation of the acceptability of the device under test are performed by a waveform monitoring apparatus 104, which embodies the present invention. In this example, waveform monitoring apparatus 104 is also rack mounted and permanently coupled to the device under test in a loop-through arrangement, so as to allow constant real-time monitoring of its output. Waveform monitoring apparatus 104 includes an integrated visual display 105 which may take the form of a color liquid crystal display. In accordance with the present invention, waveform monitoring apparatus 104 displays the level of the video signal produced by the device under test in response to a test signal, so as to confirm that the signal produced is within acceptable limits and is suitable for broadcast. In addition to integrated video display 105, the waveform display can also be conveyed by waveform monitoring apparatus 104 to an external video monitor 106, having a large native resolution, which in some cases may possibly be 1920 by 1200 pixels.

Once this procedure has been performed and the device under test has been certified for use, the waveform monitoring apparatus 104 remains in situ so as to facilitate level monitoring of the video signal being broadcast.

FIG. 2

Figure 2:
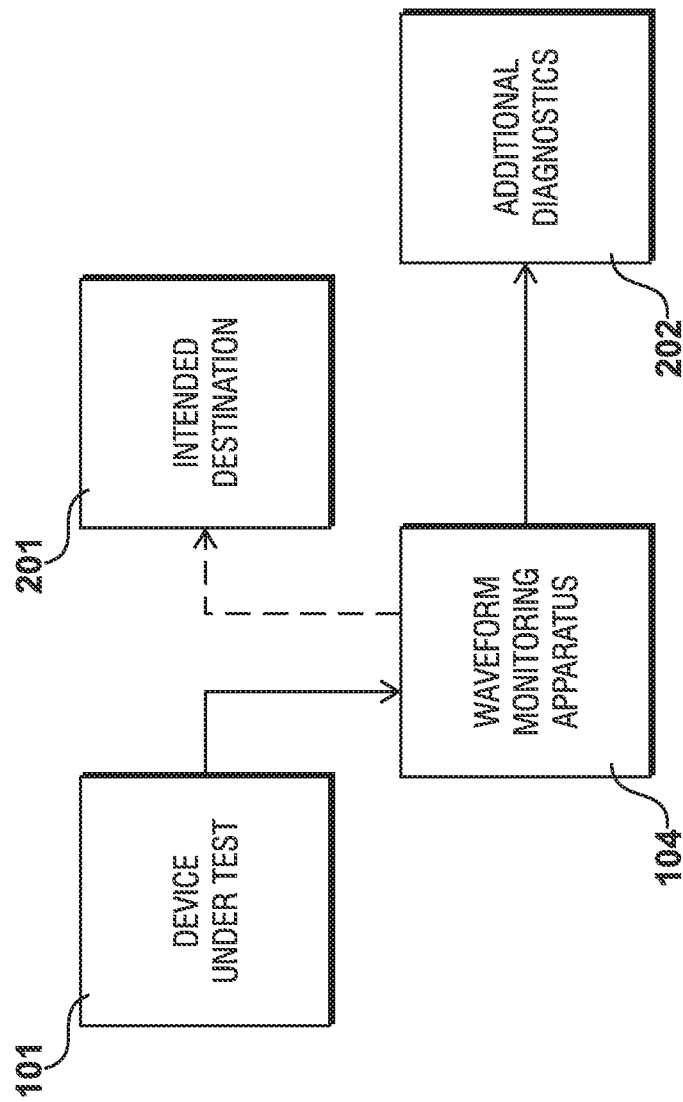
FIG. 2 is a diagrammatic representation of the waveform monitoring apparatus of the present invention.

A diagrammatic representation of the waveform monitoring apparatus 104 is shown in FIG. 2. When installed in a rack mount system for example, the device under test 101 may be connected to waveform monitoring apparatus 104 in a loop-through arrangement as previously mentioned, such that monitoring of video signal levels can be performed whilst the video signal reaches its intended destination 201, such as a recording device for example. The waveform monitoring apparatus 104 may also be connected to additional diagnostic apparatus 202 so as to facilitate additional test and measurement to take place, such as eye and jitter analysis or vectorscope display.

Thus, the waveform monitoring apparatus 104 facilitates two types of signal level monitoring: an initial set-up phase, in which a test signal, such as color bars or a linear ramp are fed to a device under test so as to analyze its response; and a confirmation phase, in which a video signal, possibly from a camera, may be analyzed so as to allow variables such as exposure and contrast to be set.

FIG. 3

Figure 3:
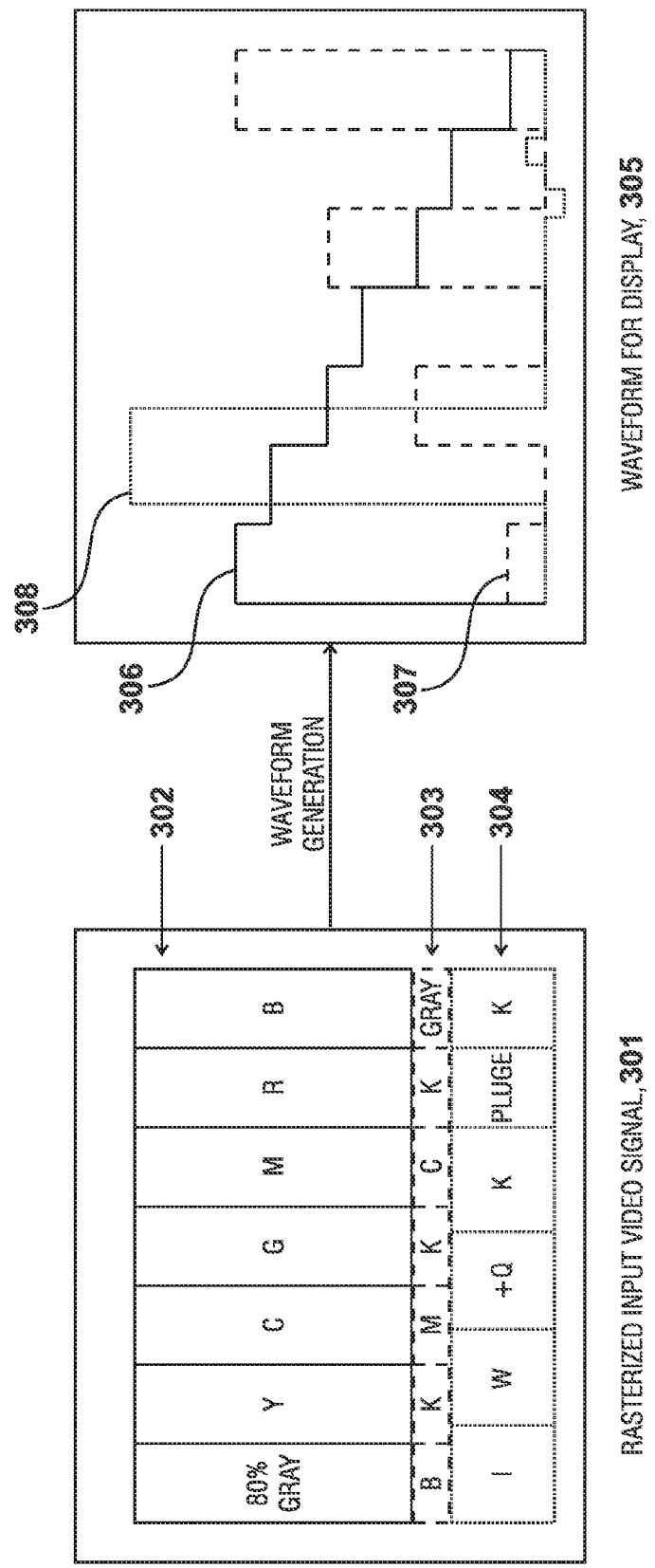
FIG. 3 shows the relationship between the raster of an input test signal and its waveform.

As described previously, during initial testing of equipment a test signal may be passed through a device under test so as to evaluate the acceptability of its installation. Part of this procedure is performed by monitoring the device's effect on a test signal passed through it. An illustration of the correspondence between a raster of a video signal and the output of a generic waveform monitor, used to evaluate the level of the video signal, is shown in FIG. 3.

In the Figure, the input video signal is a test signal, the raster of which is shown at 301. This test pattern will be familiar to those skilled in the art as a SMPTE color bar test pattern, comprising three rows: a top, color row 302, a middle, castellation row 303 and a bottom, luminance row 303.

Considering the first, color row 302, with color strips outlined with a solid line, the colors present, in order from left to right, are 80 percent gray, yellow (Y), cyan (C), green (G), magenta (M), red (R), and blue (B). In the middle, castellation row 303, with color strips outlined with a dashed line, the colors present again from left to right, are blue (B), black (K), magenta (M), black (K), cyan (C), black (K), and gray. The bottom, luminance row 303 contains strips, outlined with a dotted line, of −Inphase (I), white (W), +Quadrature (+Q), black (K), a pluge pulse and again black (K).

Following processing of the input video signal to generate a waveform for display showing the luminance of the video signal, the trace pattern shown at 305 is produced, and will be immediately familiar to those skilled in the art. It will be seen that the portion of the video signal conveying the first, color row 302 of the test signal raster gives a downward staircase from left to right, illustrated by solid line 306. The portion of the video signal conveying the second, castellation row 303 of the test signal raster gives an upward staircase from left to right, illustrated by dashed line 307. Finally, the portion of the video signal conveying the third, luminance row 304 produces a trace having a 100 percent brightness portion, and a pluge pulse, illustrated by dotted line 308.

As will be apparent to those skilled in the art, the waveform trace pattern 305 shown in FIG. 3 only details the level of the luminance portion of the color bar test signal. However, the principles of measuring and displaying the chrominance portion are identical, and so it will be appreciated that the invention described herein is capable of displaying this data.

Historically, analog waveform monitors filtered and amplified the input video signal, such as the test pattern 301, with the resulting voltage driving the vertical axis of a cathode ray tube, with a sweep circuit driving the horizontal axis in response to synchronization pulses in the video signal.

Digital waveform monitors, however, sample the incoming video signal and rasterize it so as to emulate the behavior of a cathode ray tube-type display. Previous approaches to this emulation have included attempts to emulate the persistence of the phosphors in the cathode ray tube, but most require substantial capabilities in terms of the digital signal processors used. Due to the data rate of uncompressed high definition video now having reached 2.970 gigabits per second, such as that sent over 3G-SDI channels, the processing bandwidth available must be commensurate with this data rate. The present invention seeks to provide a scheme by which the processing requirements may be reduced, thereby leading to power and cost savings.

FIG. 4

Thus, waveform monitoring apparatus 104 is shown in the form of a functional block diagram in FIG. 3.

An input video signal 401, received from a device under test, is initially supplied to a video signal digitizer 402. The input video signal 401 may in some cases be an analog video signal, whilst in others may be a digital video signal. In either case, video signal levels are represented by different voltages. In the case of an analog video signal, these voltages are constantly variable, and the video signal digitizer 401 samples these at a certain rate, usually defined by synchronization pulses present in the video signal—such techniques will be readily apparent to those skilled in the art.

More commonly nowadays, the input video signal 301 will, especially in a broadcast environment, be a serial digital video signal of the type normally conveyed over a serial digital interface (SDI). As will be known by those skilled in the art, SDI is a group of standardized video interfaces for conveying uncompressed digital video signals. Various standards exist for different video formats, ranging from 143 megabit per second links for transmitting 525 line interlaced video at 59.94 fields per second, to 2.970 gigabit per second links for transmitting 1080 line progressive scan video at 60 frames per second (3G-SDI). The data word format in SDI tends to be 10-bit wide, meaning the signal can be one of 1024 levels, with color tending to be encoded as 4:2:2 $YC_BC_R$. Thus, when considering 3G-SDI conveying high definition video, a frame's worth of data can comprise around 20 megabits of data.

The input video signal 401 is repetitively sampled by video signal digitizer 402 at appropriate video sampling points by a process of analog-to-digital conversion. In the case of a digital video signal received over SDI, in which the signal is self-clocking, this will include a process of clock recovery. The resulting sequence of video signal samples are then decoded by video signal digitizer so as to generate video pixel data, i.e. the actual pixel data making up video frames. Following this sampling, color channels are decoded. In an embodiment, the luma channel is decoded. Alternatively, conversion takes place so as to decode from the $YC_BC_R$ color space to one of a red, green or blue channel so as to allow a waveform for display to be generated. In an embodiment that may be used when processing SDI video, the video signal digitizer 402 is configured to perform a downsampling procedure so as to reduce the bit depth of the video signal from 10-bit to either 9- or 8-bit. This procedure can be carried out by performing a bit shift operation, or alternatively by taking a dithered approach to performing a divide-by-two calculation.

In a specific embodiment of the present invention, the video signal digitizer 402 is configured to interpolate the samples of the input video signal, so as to increase the temporal resolution of the video pixel data. This is because in time-sampled video data such as that produced by the analog-to-digital conversion, the video data is not a continuously varying value—it is a succession of discrete sample values measured at spaced intervals. If these values were to be plotted, such data would appear as individually spaced dots. The video signal digitizer 402 may therefore perform interpolation on the sampled values so as to produce video pixel data that is, in comparison to the sampled values, more continuous by generating a greater number of video sample points. Such interpolation may take the form of the application of a sinc interpolation (or approximation thereto) of the known type.

In an embodiment, the interpolation points may vary, possibly randomly, over time, so for one instance of a video line the interpolation is to a point one third of the way between two pixels, and for the next instance of that video line it is to a point two thirds of the way between two pixels. For each pair of pixels in a video line, interpolation only takes place to produce an extra sample between them. However, the point between the pixels that is interpolated to is one of a much larger number, and this interpolation point varies randomly each time it is performed, i.e. for every two pixels.

This type of interpolation can be performed, as it takes advantage of the fact that video signals tend to be repetitive frame-to-frame. This aids in controlling the total amount of video pixel data produced by the video signal digitizer 402. In an embodiment, the interpolation process produces video pixel data that is 512 times greater resolution than the sampled data. Thus, for high definition video, there may be 1920×512=983040 notional video sample points per video line, but, by performing the random interpolation over time, only twice the amount of data is produced.

Video signal digitizer 402 is also configured to decode, from the input video signal, signals which indicate start and end of active video regions in the video signal, the active video regions defining video lines, with a certain number of video lines per frame, say, 1080 lines in a high definition video signal. In the case of an analog signal, this would be indicated by the beginning and end of horizontal and vertical blanking intervals, whilst in the case of a digital video stream received over SDI, would be indicated by the receipt of end of active video packets and start of active video packets, which include bits set to indicate the beginning and end of horizontal and vertical blanking intervals. As will be described further with reference to FIG. 6, the start and end of active video is used to generate memory address control signals for an acquisition framestore 403.

Thus, in summary, video signal digitizer 402 receives an input video signal, which is composed of a number of video lines, and samples it at video sampling points so as to generate a sequence of video pixel data. Depending upon the implementation, the video pixel data may have been interpolated.

Acquisition framestore 403 is coupled to video signal digitizer 402, and acts as a temporary store for rasters of the input video signal 401. Acquisition framestore 403 is provided by high capacity memory, which, in an embodiment, is double data rate (DDR) type synchronous dynamic random access memory (SDRAM), providing several gigabits of storage. In an embodiment, eight gigabits of storage are provided.

The memory structure making up acquisition framestore 403 forms an address space, which is addressable in two-dimensions so as to represent an array. This array is shown in the Figure as a video pixel array 404, stored in acquisition framestore 403. Being an array, video pixel array 404 may be visualized as having rows and columns, the rows (its Y addresses) corresponding to video lines and the columns (its X addresses) corresponding to video sample points. In an embodiment, the bit-depth of the array is 9 or 8 bits, depending upon the bit shift performed by video signal digitizer 402. As will be described further with reference to FIG. 6, the memory address control signals generated by the detection of the start and end of active video are used to address video pixel array 404. The write and read pattern from video pixel array 404 will be described further with reference to FIGS. 5A and 5B.

In operation, the sequence of video pixel data generated by video signal digitizer 402 is written to the video pixel array 404 in acquisition framestore 403, so as to represent a raster of the input video signal.

Processing for waveform generation takes place in a level analyzer 404, which in an embodiment is implemented using a field-programmable gate array (FPGA). The operation of the FPGA may be initially written as a description of the hardware functionality in a hardware description language, which can then be compiled and implemented by the FPGA in the known manner.

Within the level analyzer 405 is a high-speed, random-access cache memory 406, used for storing the results of calculations. Whilst many times faster in terms of access speed than the high-capacity, possibly DDR-type SDRAM used for acquisition framestore 403, the capacity of cache memory 406 is not large. In applications of this type, the random-access memory capacity of FPGAs is of the order of kilobits—clearly not high enough when considering that a frame's worth of high definition video can approach 20 megabits. Even by reducing the bit depth of the video signal to 9- or 8-bit, the data defining a video frame is too high for feasible processing by the FPGA.

Thus, the present invention implements a divide-and-conquer approach to making the problem of processing the raster in video pixel array 404 tractable.

As will be described further with reference to FIG. 5B, the video pixel array 404 is split into segments—effectively groups of columns of the array—each of which are read and processed one-by-one. A sequence of video level data is returned by the processing procedure, defining the brightness of the pixels that are to display the waveform.

Level analyzer 405 is coupled to an output framestore 407, which temporarily stores the video level data following analysis. Output framestore 407 is, like acquisition framestore 403, provided by high capacity memory, such as DDR SDRAM. The memory structure within output framestore 407 again represents an array—in this case a display pixel array 408—which is again addressable by row (Y addresses) and by column (X addresses). As will be described further with reference to FIG. 6, the number of display sample points need not be equal to the number of video sample points. Display pixel array 408 has, in an embodiment, a bit depth of 8 bits, allowing up to 256 video levels to be defined.

In an embodiment of the present invention, video level data for a segment of a first frame can be read from the display pixel array back into the cache memory when the same segment of the next frame is being analyzed. This provides the persistence emulation, and, by multiplying the video level data by a decay factor, allows tuneable persistence to be achieved. The decay factor may take a value between zero (no persistence) and unity (infinite persistence). This process will be described further with reference to FIGS. 6 and 7. Exponential decay may be emulated by the decay factor being set to $e^{-1}$ (the inverse of the base of the natural logarithm), or an exponent thereof, i.e. $e^{-n}$. In other embodiments, a look up table could be used to improve the calculation time for persistence emulation.

In an embodiment, a display compositor 409 is also provided which reads the video level data from display pixel array 408, so as to allow generation of a graphical user interface for display. The display compositor may include features such as color and intensity mapping, and other such features known in the art. Finally, a display device 410, such as integrated video display 105, may also be provided within the waveform monitor apparatus so as to allow waveform monitoring without the need to attach an external display. Alternatively, the display device 410 may be provided by an external device, such as external video monitor 106.

FIGS. 5A & 5B

Figure 5A:
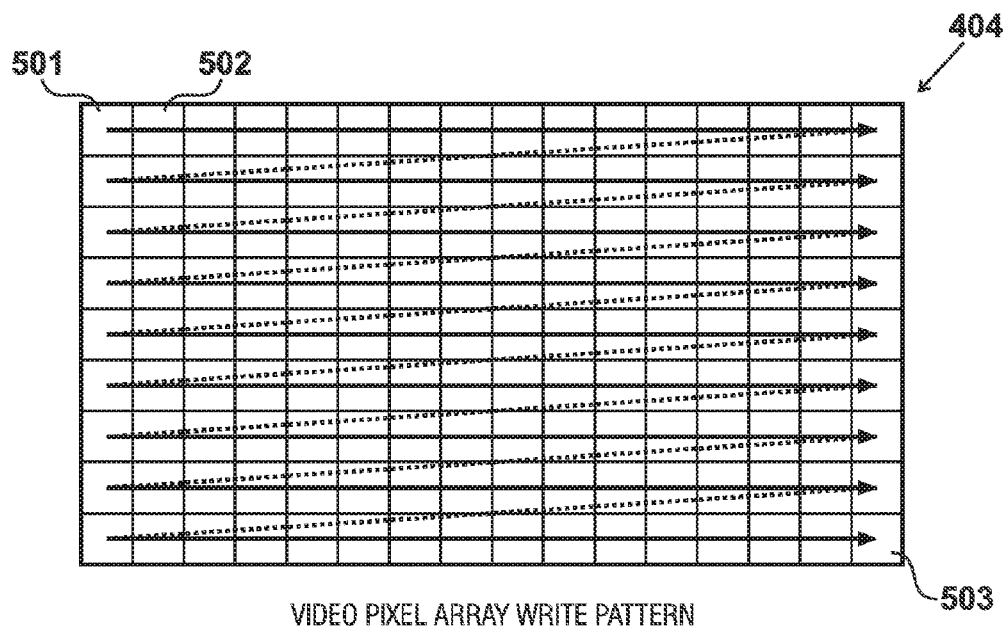
FIGS. 5A and 5B show write and read patterns to and from a video pixel array used by the present invention.
Figure 5B:
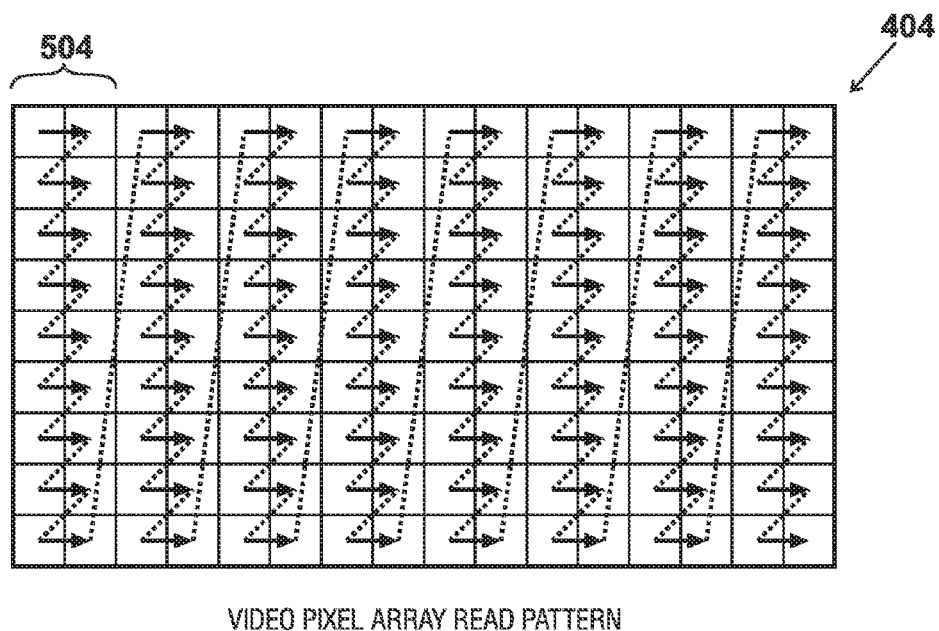

The read and write pattern of data to and from acquisition framestore 403 is illustrated in FIGS. 5A and 5B respectively.

Figure 4:
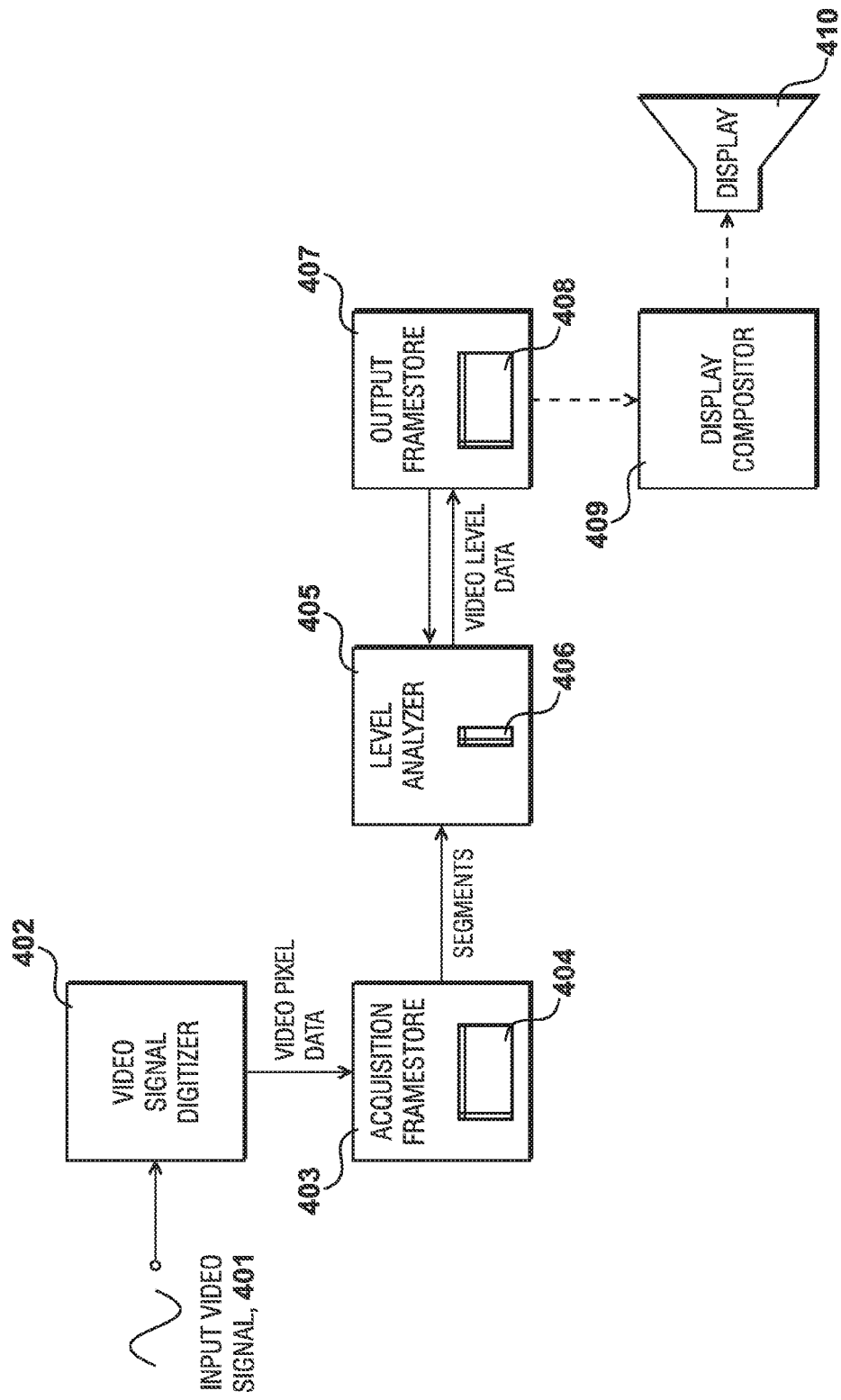
FIG. 4 is a diagram of functional blocks employed by the present invention.

As described previously with reference to FIG. 4, video signal digitizer 402 generates a sequence of video pixel data representing lines of active video. Each individual pixel's worth of data is written to an address in the video pixel array 404, which is shown in FIG. 5A. For the purposes of illustration, the video pixel array 404 is shown having 9 rows and 16 columns, but will of course in practice have as many rows as video lines in the signal (possibly 1080), and as many columns as video sample points (possibly 1920 if no interpolation has taken place, or perhaps twice times this if interpolation has taken place), so as to allow a raster of the video signal to be stored in the array.

As described previously, video signals include specific data that indicates when a video line is being transmitted, and when a new line should start. Thus, when data is written into video pixel array 404, the first video pixel of the frame is written to the first address in the video pixel array: address 501. The next video pixel of the frame is written to the second address: address 502. This continues until the row is filled, corresponding to the end of active video and the beginning of the horizontal blanking interval. Writing of data continues in this fashion until the final address in the video pixel array, address 503, has been written to and the raster of the video signal is complete.

As described previously with reference to FIG. 4, video pixel data is not read from video pixel array 404 in the order it is written. The read pattern is illustrated in FIG. 5B. A segment of video pixel array 404 is defined as a group of at least one column, but not all the columns in video pixel array 404. Thus, when video pixel data is read from video pixel array 404, a first segment 504 is read by reading out the video pixel data serially and row-by-row. For the purposes of illustration, the segments are shown to be two columns wide in FIG. 5B, but in the actual implementation of the present invention they are between 16 and 64 columns wide. This range is seen to represent a good trade-off between not overloading the cache memory 406 in level analyzer 405, and achieving a reasonable burst speed from acquisition framestore 403.

FIG. 6

Figure 6:
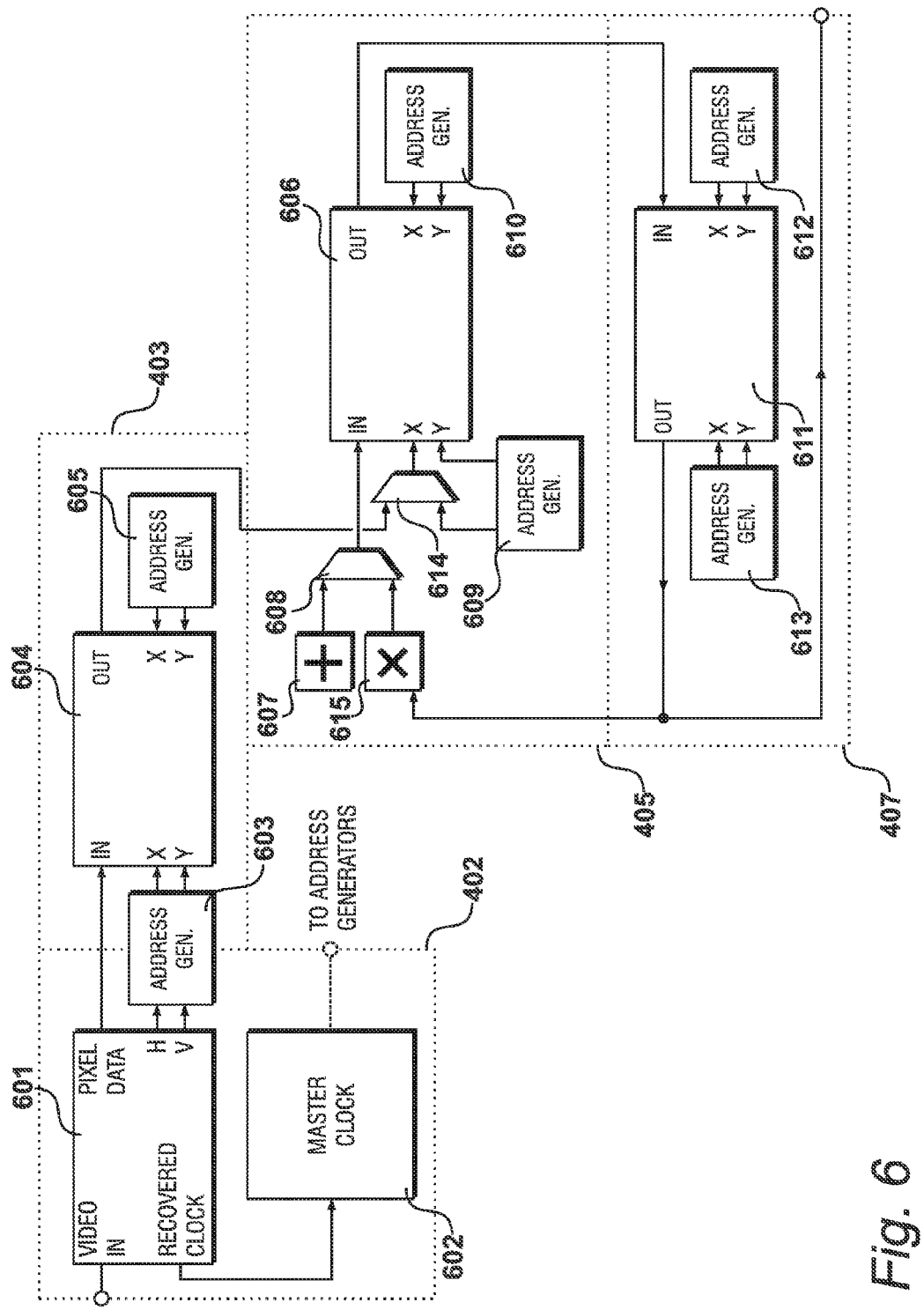
FIG. 6 shows components making up the functional blocks shown in FIG. 4.

Components making up the functional blocks of waveform monitoring apparatus 104 are shown in FIG. 6.

The input video signal 401 is received at a video in terminal of a digitizer 601, forming part of the video signal digitizer block 402. A clock-recovery process takes place in digitizer 601, generating a recovered clock signal from the input video signal 401. In the case of a serial digital video signal, this recovered clock may be generated by a phase locked loop. For an analog signal, it may be derived from the horizontal and vertical synchronization pulses. The recovered clock signal is supplied to a master clock circuit 602, which is coupled to various systems in waveform monitoring apparatus 104, such as memory address generators, as will be described further now.

Horizontal and vertical synchronization pulses (H and V respectively) are recognized in the input video signal 401 by the digitizer 601, and supplied to an acquisition write address generator 603. Acquisition write address generator 603 is coupled to acquisition memory 604, forming part of acquisition framestore 403, having video pixel array 404 stored therein. As described previously with reference to FIG. 4, acquisition memory 604 is high in capacity, and may take the form of DDR SDRAM. Following sampling by digitizer 601, the sequence of video pixel data is supplied to the input of acquisition memory 604, and is written to addresses determined by acquisition write address generator 603, which specifies address in terms of X and Y values. In the embodiment of the invention that does not perform interpolation on the video pixel data, then the X values are incremented at the same rate as video pixels in the video signal are received. Thus, for a high definition signal, the X address will range from 1 to 1920. When a horizontal blanking interval is detected, then the Y address will increment, thereby filling the video pixel array 404 in the manner described previously with reference to FIG. 5A. In the event that the video pixel data is interpolated, then the X address generated by acquisition write address generator 603 will be a multiple of the rate at which video pixels are received in the input video signal 401.

An acquisition read address generator 605 is also provided, which controls the read-out of video pixel data from the video pixel array stored in acquisition memory 604. Read out addresses are generated so as to read video pixel data as segments, as described previously with reference to FIG. 5B. The output of acquisition memory 604 is supplied to cache memory 606, which forms part of level analyzer 405, and where it is used at this point to control the Y address that a constant is added to by, in this embodiment, an adder 607 via a multiplexer 608.

A cache write address generator 609 is provided which, during this process controls the X address of the cache memory 606, and increments the X address at a rate determined by the desired display size for the waveform. Thus, if the video pixel array is 1920 addresses wide, and the waveform for display is to be half that width, i.e. 960 display sample points, then cache write address generator 609 steps along at half the rate at which acquisition read address generator 605 reads video pixel data out of acquisition memory 604.

A cache read address generator 610 controls the read addresses of cache memory 606, so as to allow video level data to be supplied to the input of output memory 611, forming part of output framestore 407. The write addresses for output memory 611 are determined by an output write address generator 612, which, for a segment of video level data read from cache memory 606, writes the segment in sequence to Y addresses in a single X address. This is to allow the maximum throughput, as, in a similar way to acquisition memory 604, output memory 611 is, in a specific embodiment, high capacity DDR SDRAM.

As segments of the video pixel array 404 are analyzed, and video level data is written to display pixel array 408, eventually a frame's worth of video will have been analyzed and a waveform will be complete for read out, and possible supply to display compositor 409 and display 410. Recalling that the sequence of video level data for different segments of a video frame is written sequentially into rows in display pixel array, effectively in the same manner that video pixel data is written to video pixel array 404, then it will be understood that read out of display pixel array 408 in a same manner as segments are read from video pixel array 404 will result of a sequence of video level data being provided which can be rasterized for display. Thus, an output read address generator 613 is provided and configured to implement this read out process.

In order to emulate persistence, an embodiment of the present invention includes measures for reloading a segment's worth of video level data from display pixel array 408 and back into the cache memory 406. Thus, when a frame has been fully analyzed and its waveform generated, and processing of a new frame of video is due to begin, then output read address generator 613 reads the contents of one row of the display pixel array 404 into cache memory 606, which is achieved by multiplexer 608 switching states so as to allow the existing video level data to be supplied to cache memory 606. Cache write address generator 609 takes over the control of the Y write address of cache memory 606 in addition to control of the X write address by means of a second multiplexer 614 switching states in an appropriate fashion.

An adjustable multiplier 615 is provided to multiply each value of pixel level data by a persistence decay factor. This factor is, in an embodiment, adjustable, so as to allow the variance of the persistence effect to range between none to infinite.

FIG. 7

Figure 7:
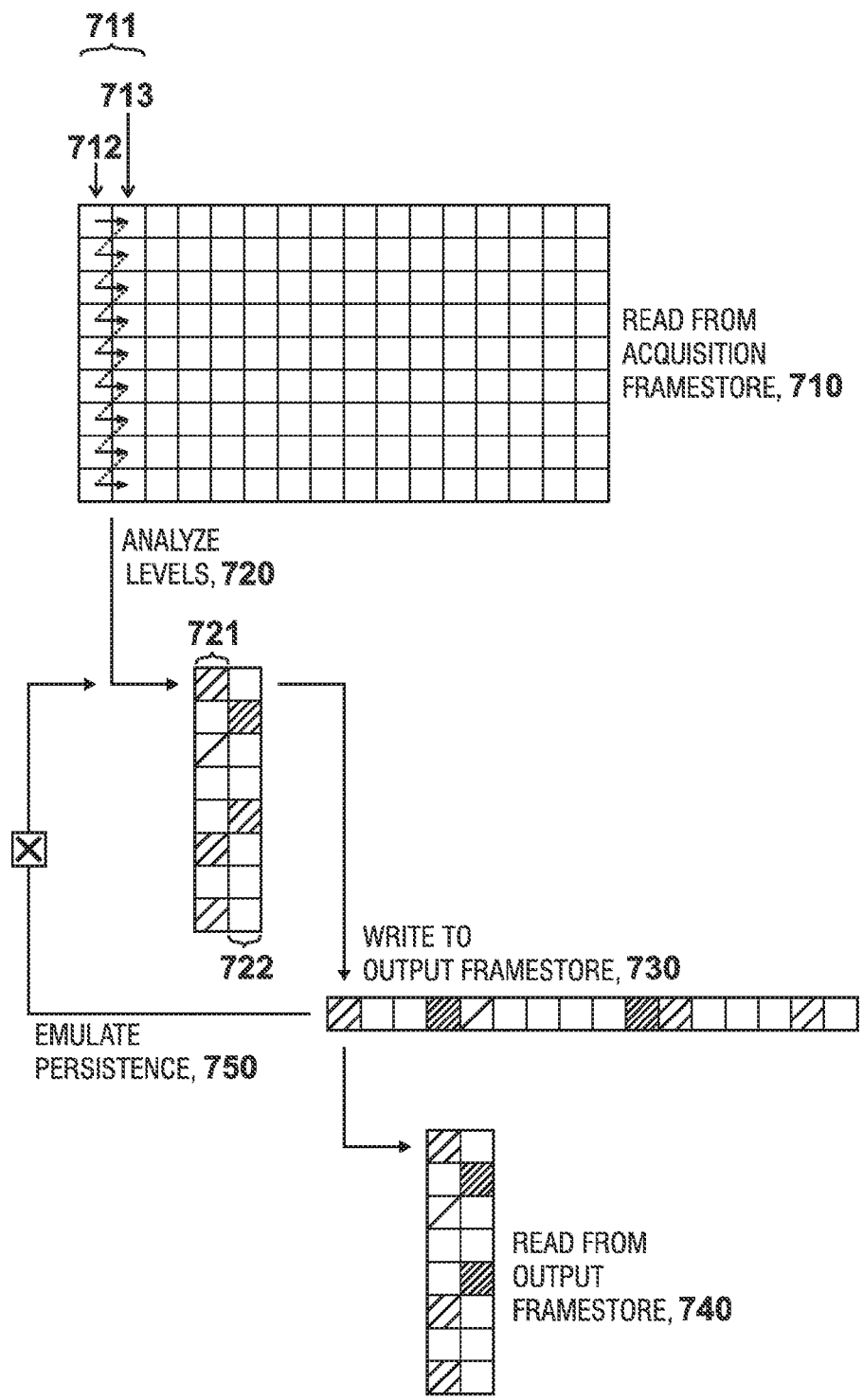
FIG. 7 shows processing stages to generate a waveform for display.
Figure 8:
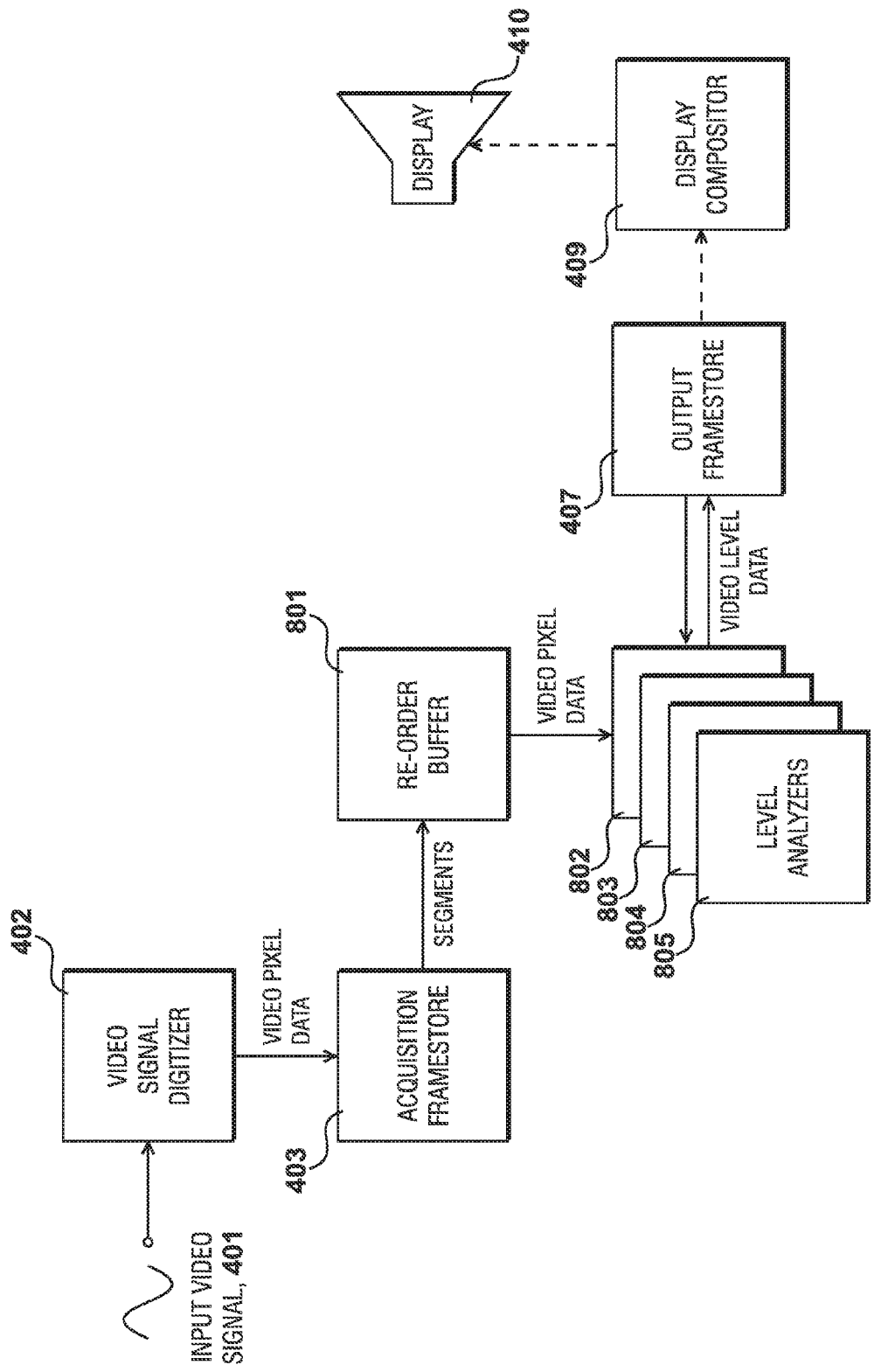
FIG. 8 shows an alternative multi-threaded embodiment of the present invention.

A diagrammatic representation of data flow in the present invention is shown in FIG. 7.

Following population of video pixel array 404, a first stage 710 comprising reading a segment 711 of video pixel data from the acquisition framestore takes place. This video pixel data is used to control the Y address of cache memory 406, into which a constant is written and accumulated—thus, the luminance value of a particular video pixel determines to where the value is written. Consider the scenario shown in FIG. 7: segment 711 includes two columns: first column 712 and second column 713. In this example, say that the video pixels are described by 3 bits, i.e. they can have luminance values of between 0 and 7. If three pixels in first column 712 were of value 0, one was of value 3 and three of value 5 and two were of value 7, then the results of a level analysis stage 720 would be as shown at column 721 of the cache memory 406, in which pixel counts are shown by diagonal lines. Similarly, if in second column 713 were five pixels of value 1 and four of value 5, then the accumulated count cache memory 406 would appear as shown at column 722.

Thus, it may be seen that the cache memory 406 counts the instances of pixels in the input video signal that are of a particular level. This is performed in a segmented fashion, breaking the problem down from one of analyzing of the order of megabits of data into one of analyzing of the order of kilobits at a time. This allows a balance to be struck in terms of throughput of data out from the framestores and the amount of data that can be stored in the cache memory in the FPGA.

When read from cache memory 406 as a sequence, the video level data is written to one row in the display pixel array in output framestore 408 at a stage 730. When the entirety of the display pixel array has been populated with video level data, this can then be read at stage 740 from the output framestore so as to allow compositing to take place for display purposes. In addition, a persistence emulation stage 750 can also be performed, in which the video level data for a particular segment of one frame is read back into cache memory 406, possibly including multiplication by a decay constant, when the segment is being analyzed for a next frame. The values written into cache memory 406 during this persistence emulation stage are then added to during the level analysis stage 720.

FIG. 8

In a specific embodiment of the present invention, the process of level analysis is multi-threaded, by providing a plurality of level analyzers.

Thus, input video signal 401 is digitized as previously described by video signal digitizer 402, from which a sequence of video pixel data is then written into acquisition framestore 403. From here, however, segments of video pixel data are instead transferred to a re-order buffer 801, in which re-ordering of the video pixel data takes place so as to allow time-division multiplexing to take place between, in this example, four level analyzer blocks 802, 803, 804 and 805. This means that the time spent changing addresses, in the cache memory in the four level analyzer blocks 802 to 805 is minimized, along with the reading back into the cache memory of previous frames' worth of segments for persistence emulation. Output framestore 407, display compositor 409 and display 410 remain present in this embodiment. This arrangement allows scaling of the present invention's capabilities to video signals having 4K and 8K ultra high definition resolution.

What we claim is:

1. Video signal waveform monitoring apparatus for receiving an input video signal composed of video lines, and whose level is to be monitored, the apparatus comprising:
    a video signal digitizer configured to sample the input video signal at video sample points, thereby generating a sequence of video pixel data, wherein the video signal digitizer is configured to interpolate the sampled input video signal to increase the number of video sample points, thereby increasing the temporal resolution of the video pixel data;
    an acquisition framestore organized into a video pixel array having rows corresponding to video lines and columns corresponding to video sample points, into which the sequence of video pixel data is written so as to represent a raster of the input video signal;
    a level analyzer configured to serially read video pixel data row-by-row from segments of the video pixel array, and configured to increment video level data at addresses in cache memory in response to the serially-read video pixel data, from which a sequence of video level data is generated; and
    an output framestore organized into a display pixel array, into which the sequence of video level data is written, and which when read for display represents the level of the waveform of the input video signal;
    wherein the segments of the video pixel array comprise at least one and less than all of the columns in the video pixel array, and the number of columns in the display pixel array is a fraction of the number of columns in the video pixel array.

2. The apparatus of claim 1, in which the level analyzer is further configured to read video level data from the display pixel array into the cache memory, wherein the video level data corresponds to a previous analysis of a matching segment of the video pixel array, so as to provide a persistence effect.

3. The apparatus of claim 2, in which the level analyzer includes a persistence multiplier configured to multiply the value of the video level data read from the display pixel array by a decay constant.

4. The apparatus of claim 1, in which the video signal is a serial digital video signal received via a serial digital interface from a device under test.

5. The apparatus of claim 1, in which the acquisition framestore and the output framestore are implemented by double data rate synchronous dynamic random-access memory, and the level analyzer is implemented by a field-programmable gate array.

6. The apparatus of claim 1, further comprising a display compositor coupled to the output framestore and configured to read the video level data stored therein for incorporation into a graphical user interface.

7. The apparatus of claim 1, in which the video signal digitizer is configured to decode one of a luma channel, a red channel, a blue channel or a green channel from the input video signal.

8. The apparatus of claim 1, further comprising at least one other level analyzer such that the apparatus includes a plurality of level analyzers, the apparatus further comprising a multiplexer configured to time-division multiplex the video pixel data between the plurality of level analyzers.

9. A method comprising generating a waveform from an input video signal, the input video signal being composed of video lines and whose level is to be monitored, the method including step of:
    digitizing the input video signal at video sampling points, thereby generating a sequence of video pixel data, including a process of interpolating the sampled input video signal to increase the number of video sample points, thereby increasing the temporal resolution of the video pixel data;
    writing the sequence of video pixel data into a video pixel array having rows corresponding to video lines and columns corresponding to video sample points, so as to represent a raster of the input video signal;
    serially reading video pixel data row-by-row from segments of the video pixel array;
    incrementing video level data at addresses in a cache, wherein the addresses are selected in response to the serially-read video pixel data, thereby generating a sequence of video level data; and
    writing the sequence of video level data to a display pixel array, which when read represents the level of the waveform of the input video signal;
    wherein the segments of the video pixel array comprise at least one and less than all of the columns in the video pixel array, and the number of columns in the display pixel array is a fraction of the number of columns in the video pixel array.

10. The method of claim 9, further comprising a step of loading video level data from the display pixel array into the cache, wherein the video level data corresponds to a previous analysis of a matching segment of the video pixel array, so as to provide a persistence effect.

11. The method of claim 10, in which the video level data corresponding to a previous analysis is multiplied by a decay constant.

12. The method of claim 9, in which the video pixel data corresponds to one of a plurality of color channels decoded from the input video signal.

13. A non-transitory computer readable medium having computer executable instructions encoded thereon, which, when executed by a computer, cause the computer to generate a waveform from an input video signal, the input video signal being composed of video lines and whose level is to be monitored, by carrying out steps of:
    digitizing the input video signal at video sampling points, thereby generating a sequence of video pixel data, including a process of interpolating the sampled input video signal to increase the number of video sample points, thereby increasing the temporal resolution of the video pixel data;
    writing the sequence of video pixel data into a video pixel array having rows corresponding to video lines and columns corresponding to video sample points, so as to represent a raster of the input video signal;
    serially reading video pixel data row-by-row from segments of the video pixel array;
    incrementing video level data at addresses in a cache, wherein the addresses are selected in response to the serially-read video pixel data, thereby generating a sequence of video level data; and writing the sequence of video level data to a display pixel array, which when read represents the level of the waveform of the input video signal;

wherein the segments of the video pixel array comprise at least one and less than all of the columns in the video pixel array, and the number of columns in the display pixel array is a fraction of the number of columns in the video pixel array.

14. The non-transitory computer readable medium of claim 13, comprising additional instructions which will cause the computer to perform a step of loading video level data from the display pixel array into the cache, wherein the video level data corresponds to a previous analysis of a matching segment of the video pixel array, so as to provide a persistence effect.

15. The non-transitory computer readable medium of claim 14, comprising additional instructions which will cause the computer to multiply the video level data corresponding to a previous analysis by a decay constant.

16. The non-transitory computer readable medium of claim 15, wherein the video pixel data corresponds to one of a plurality of color channels decoded from the input video signal.

* * * * *